Jan. 7, 1936.  L. J. LISTA  2,027,281
FOOD GRINDER
Filed July 2, 1934
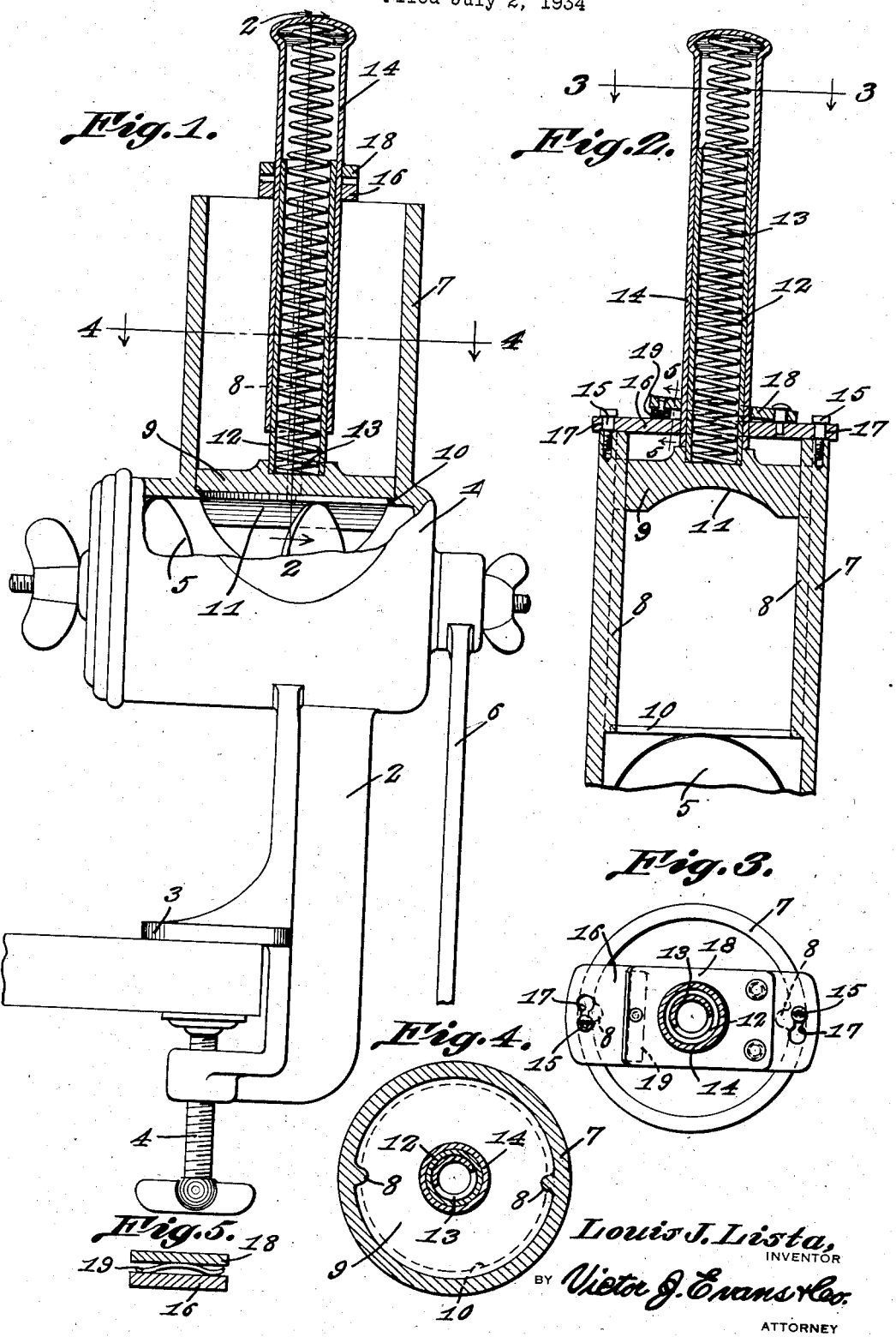
Louis J. Lista, INVENTOR
BY Victor J. Evans & Co.
ATTORNEY Patented Jan. 7, 1936

2,027,281

UNITED STATES PATENT OFFICE 2,027,281

FOOD GRINDER

Louis J. Lista, Mount Shasta, Calif.

Application July 2, 1934, Serial No. 733,483

2 Claims. (Cl. 146—182)

This invention relates to food grinders and its general object is to provide a grinder that includes automatic feeding means for the food hopper, which not only entirely eliminates danger of injury to the operator, but it feeds the matter to be ground in a uniform manner, which of course facilitates easy operation and expeditious grinding or crushing action.

Another object of the invention is to provide a food grinder of the character set forth, that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a view of my grinder with parts in side elevation and in section and illustrates the feeding plunger fully extended within the hopper.

Figure 2 is a sectional view taken approximately on line 2—2 of Figure 1, looking in the direction of the arrows, with the plunger arranged in its outermost position.

Figure 3 is a sectional view taken approximately on line 3—3 of Figure 2, looking in the direction of the arrows.

Figure 4 is a sectional view taken approximately on line 4—4 of Figure 1, looking in the direction of the arrows.

Figure 5 is a sectional view taken approximately on line 5—5 of Figure 2, looking in the direction of the arrows.

Referring to the drawing in detail, the reference numeral 1 indicates the body of my grinder which as shown is cylindrical in formation and is supported horizontally through the instrumentality of a bracket 2 that includes a clamping means for securing the device to a table top or the like as clearly shown in Figure 1. The clamping means is provided with a jaw 3 having a thumb screw 4 cooperating therewith to set up a clamping engagement as will be apparent.

The body has arranged therein the usual spiral conveyor means 5 for disposing the matter to be ground or crushed through a grinding plate, not shown. The means 5 is of course removable and is rotated through the instrumentality of a handle 6.

Formed with and rising from the body 1 is a hopper 7 which is substantially long or relatively high in order to accommodate a maximum amount of matter to be ground, and the hopper is preferably of cylindrical formation, and has ribs 8 arranged interiorly thereof and upon diametrically opposite sides, as clearly shown in Figure 2.

The ribs extend for the entire height of the hopper and act as guide means for a plunger 9, the latter having recesses arranged in diametrically opposite sides thereof to receive the ribs, and in order to limit the downward movement of the plunger within the hopper I provide an annular flange 10 formed with the hopper at its juncture with the body, as best shown in Figure 1. The plunger slidably fits the hopper and has a rounded recess 11 arranged in its lower surface so that the plunger can be disposed in close association with the means 5.

Formed with and rising from the plunger 9 is a tube 12 within which is disposed a coil spring 13, and telescopically mounted on the tube 12 is a tube 14 having a closed upper end, and which cooperates with the tube 12 to provide a housing for the spring, the latter having its upper convolution engaging the closed upper end of the tube 14, while its lower convolution engages the top of the plunger 9.

Bridging the upper end of the hopper 7 and removably secured with respect thereto through the medium of headed screw bolts 15 is a cross bar 16 which is provided with key hole shape openings 17 adjacent to its ends to receive the screw bolts 15, to facilitate the easy removal of the cross bar as will be apparent.

Loosely mounted on the upper end of the cross bar 16 through the medium of rivets extending through one end portion thereof, as best shown in Figure 2, is what may be termed a clamping plate 18 that has its opposite end free and disposed between the last mentioned end portion and the cross bar respectively is a leaf spring 19 that normally holds the clamping plate against the tube 14 for a purpose which will be presently apparent, it being noted that both the cross bar and clamping plate are provided with registering openings for the passage of the plunger rod therethrough, the plunger rod including the tubes 12 and 14 and the coil spring 13.

From the above description and disclosure of the drawing, it will be obvious that I have provided a food grinder that includes an automatic feeding means for the hopper thereof, and while I have shown the hopper as being formed integral with the body 1, I want it understood that the hopper can be in the form of an attachment to be secured to food grinders now in general use, and any suitable means may be employed for that purpose.

In the use of my device, the matter to be ground is inserted within the hopper 7, the plunger and its associated parts including the cross bar and clamping plate are then disposed in operative position, as shown in Figure 2, and it will be seen that the clamping plate 18 will hold the tube 14 against downward movement, but the spring 13 will urge the plunger downwardly against the matter to be ground, for disposing the latter within the means 5. As the plunger travels downwardly, the spring pressure can be retained uniform merely by pushing the tube 14 which will be retained in any of its adjusted positions through the instrumentality of the clamping plate 18.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a food grinder, a hopper therefor, automatic feeding means for said hopper and including a plunger, guiding means for said plunger, a tube secured to and rising from said plunger, a tube having a closed upper end and telescopically mounted on the tube first mentioned, a spring arranged in the tube and engageable with the plunger and the closed upper end respectively, a cross bar detachably secured to the upper end of the hopper, and a clamping plate engageable with the outermost tube and together with the cross bar being provided with registering openings for the passage of the tubes therethrough.

2. In a food grinder, a hopper therefor, a plunger mounted to travel in said hopper, means to limit the downward of the plunger, a tube secured to and rising from the plunger, a tube having a closed upper end and telescopically mounted on the tube first mentioned, a coil spring arranged in the tubes with the lower convolution engageable with the plunger and its upper convolution engageable with the closed upper end, a cross bar detachably secured to and bridging the upper end of the hopper, a clamping plate having one end loosely secured to the cross plate and its opposite end free, said cross bar and clamping plate having registering openings therein for the passage of the tubes, and spring means for urging the clamping plate in engagement with the outer tube to hold the latter at various adjusted positions.

LOUIS J. LISTA.